(12) United States Patent
Lee et al.

(10) Patent No.: US 10,630,750 B2
(45) Date of Patent: Apr. 21, 2020

(54) ELECTRONIC DEVICE AND CONTENT REPRODUCTION METHOD CONTROLLED BY THE ELECTRONIC DEVICE

(71) Applicant: SAMSUNG ELECTRONICS CO., LTD., Suwon-si (KR)

(72) Inventors: Jong-hyuk Lee, Suwon-si (KR); Da-hee Jeong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 137 days.

(21) Appl. No.: 15/420,898

(22) Filed: Jan. 31, 2017

(65) Prior Publication Data
US 2017/0223084 A1     Aug. 3, 2017

(30) Foreign Application Priority Data
Feb. 1, 2016   (KR) .................. 10-2016-0012455

(51) Int. Cl.
*H04L 29/02*     (2006.01)
*H04L 12/825*    (2013.01)
(Continued)

(52) U.S. Cl.
CPC .............. *H04L 65/80* (2013.01); *H04L 47/14* (2013.01); *H04L 47/25* (2013.01); *H04L 65/4092* (2013.01); *H04L 65/604* (2013.01); *H04N 21/26258* (2013.01); *H04N 21/44004* (2013.01); *H04N 21/44209* (2013.01); *H04N 21/4621* (2013.01); *H04N 21/6379* (2013.01);
(Continued)

(58) Field of Classification Search
CPC ......... H04L 47/14; H04L 47/25; H04L 47/30; H04L 65/4084; H04L 65/608; H04L 65/80; H04L 67/06; H04L 67/104

USPC ........................................................ 709/219
See application file for complete search history.

(56) References Cited

U.S. PATENT DOCUMENTS

| | | | |
|---|---|---|---|
| 8,218,439 B2 | 7/2012 | Deshpande | |
| 2009/0307367 A1* | 12/2009 | Gigliotti | ................. G06F 15/16 709/231 |

(Continued)

FOREIGN PATENT DOCUMENTS

| | | |
|---|---|---|
| CN | 101242359 A | 8/2008 |
| CN | 101511010 A | 8/2009 |
| CN | 101771492 A | 7/2010 |

OTHER PUBLICATIONS

Encoding, "Understanding bitrates in video files", Jan. 8, 2016, encoding.com, web.archive.org/web/20160108060638/http://help.encoding.com/knowledge-base/article/understanding-bitrates-in-video-files/ (Year: 2016).*

(Continued)

*Primary Examiner* — Ruolei Zong
(74) *Attorney, Agent, or Firm* — Sughrue Mion, PLLC

(57) ABSTRACT

An electronic device includes a communicator configured to receive content from an external device via a network; a display configured to display the received content while the content is being received by the communicator; a processor; and a memory storing one or more programs executable by the processor. The one or more programs include instructions for buffering the received content, comparing a status of the network with a bitrate of the content, and determining when to start reproducing the content based on a result of the comparing.

14 Claims, 11 Drawing Sheets

(51) Int. Cl.

| | | |
|---|---|---|
| *H04L 12/835* | (2013.01) | |
| *H04L 12/801* | (2013.01) | |
| *H04L 29/06* | (2006.01) | |
| *H04N 21/262* | (2011.01) | |
| *H04N 21/6379* | (2011.01) | |
| *H04N 21/462* | (2011.01) | |
| *H04N 21/442* | (2011.01) | |
| *H04N 21/44* | (2011.01) | |
| *H04N 21/845* | (2011.01) | |

(52) U.S. Cl.
CPC ......... *H04N 21/8456* (2013.01); *H04L 47/30* (2013.01); *H04L 65/4084* (2013.01); *H04L 65/608* (2013.01)

(56) References Cited

U.S. PATENT DOCUMENTS

| | | | |
|---|---|---|---|
| 2009/0307368 A1 | 12/2009 | Sriram et al. | |
| 2010/0281142 A1* | 11/2010 | Stoyanov | H04N 21/23406 709/221 |
| 2011/0019976 A1 | 1/2011 | Park et al. | |
| 2012/0218887 A1 | 8/2012 | Khilnani et al. | |
| 2012/0307654 A1* | 12/2012 | Pantos | H04L 47/30 370/252 |
| 2013/0227080 A1 | 8/2013 | Gao et al. | |
| 2013/0308919 A1* | 11/2013 | Shaw | H04N 21/2221 386/239 |
| 2014/0173055 A1 | 6/2014 | Yu | |
| 2014/0280749 A1 | 9/2014 | Arana et al. | |
| 2014/0325550 A1* | 10/2014 | Winograd | H04N 21/44236 725/19 |
| 2015/0201226 A1 | 7/2015 | Hunt | |

OTHER PUBLICATIONS

International Search Report and Written Opinion, issued by International Searching Authority in International Application No. PCT/KR2017/001005, dated Apr. 18, 2017, (PCT/ISA/220, PCT/ISA/210 & PCT/ISA/237).

Communication dated Nov. 9, 2018, issued by the European Patent Office in counterpart European Application No. 17747692.6.

Communication dated Jan. 6, 2020 issued by the State intellectual Property Office of P.R. China in counterpart Chinese Application No. 201780006248.1.

* cited by examiner

FIG. 10

| PROTOCOL TYPE | BUFFERING TIME PERIOD NECESSARY FOR STARTING REPRODUCTION | | COMPARISON (UNIT %) |
|---|---|---|---|
| | COMPARATIVE EXAMPLE | EMBODIMENT | |
| HTTP | 3.3065 | 0.7427 | 77.53818237 |
| HLS | 4.3592 | 0.3955 | 90.92723435 |
| Smooth | 2.0897 | 0.6133 | 70.65128966 |
| WV | 3.4065 | 0.9427 | 72.32643476 |

ELECTRONIC DEVICE AND CONTENT REPRODUCTION METHOD CONTROLLED BY THE ELECTRONIC DEVICE

CROSS-REFERENCE TO RELATED APPLICATION

This application claims priority from Korean Patent Application No. 10-2016-0012455, filed on Feb. 1, 2016 in the Korean Intellectual Property Office, the disclosure of which is incorporated herein in its entirety by reference.

BACKGROUND

1. Field

Apparatuses and methods consistent with exemplary embodiments to electronic devices and content reproduction methods performed by the electronic devices, and more particularly, to an electronic device that receives content and determines whether to start reproducing the received content, and a content reproduction method performed by the electronic device.

2. Description of the Related Art

A streaming service involves techniques for transmitting and utilizing data in real time. According to a streaming service, a user may reproduce or playback content after downloading only a portion of the content without having to download the entire content. In other words, streaming is performed by transmitting only a part of the content, namely, only the amount of content necessary to enjoy the video in real time. As technologies for providing such a streaming service have greatly advanced, real-time Internet Protocol television (IPTV) and video-on-demand (VOD) became very popular among consumers of digital media. In particular, as mobile devices get more widely adopted, the demand for and use of digital streaming services on mobile devices via a wireless network is skyrocketing.

The streaming service is greatly affected by the conditions of the network. Because the frequency, amount, and pattern of network use may vary among different users, the health and conditions of a network, including its transfer rate, latency, and error rate, may vary greatly depending on time and location. Particularly, because a streaming service for a mobile apparatus relies on a wireless network and fading or interference may occur on a wireless network due to environmental factors, it is highly possible that the quality of streaming may fluctuate more dramatically on a wireless network compared to a wired network.

In order to provide a reliable streaming service under suboptimal network conditions, buffering may be necessary to alleviate some of the negative effects of erratic network performance. Buffering is a method in which surplus data is temporarily stored when data is transmitted from a first apparatus to a second apparatus, and there exists a difference in data processing speed between the first apparatus and the second apparatus. Buffering is used in all types of computer systems.

For media streaming, buffering is performed by receiving and storing a certain amount of content in advance before the content is reproduced. By performing buffering, if a network speed momentarily decreases, the stored content may be reproduced. Conversely, if the network speed picks up again, any surplus data that cannot be reproduced immediately may be stored, and then, reproduced as necessary.

In general, electronic devices may start reproducing content data when a certain amount of data is buffered. Accordingly, a user may not able to watch the video for a relatively long time depending network conditions.

SUMMARY

Exemplary embodiments provide devices for and methods of adaptively determining whether to start reproducing received content according to a network situation.

According to an aspect of an exemplary embodiment, an electronic device includes a communicator configured to receive content from an external device via a network; a display configured to display the received content while the content is being received by the communicator; a processor; and a memory storing one or more programs executable by the processor. The one or more programs may include instructions for buffering the received content, comparing a status of the network with a bitrate of the content, and determining when to start reproducing the content based on a result of the comparison.

The one or more programs may further include instructions for comparing a time period during which the buffered content is reproducible with a time period taken to receive the content, and determining when to start reproducing the content based on a result of the comparison.

The communicator may receive at least one of a first content item having a first bitrate and a second content item having a second bitrate, wherein the first content item and the second content item have an identical subject matter. The first bitrate may be different from the second bitrate.

The one or more programs may further include instructions for comparing a download speed of the content received from the external device with the bitrate of the content.

The one or more programs may further include instructions for requesting the external device to transmit additional content having an identical subject matter as the received content and a bitrate different from the bitrate of the received content, in response to the download speed of the content being higher than the bitrate of the content.

The one or more programs may further include instructions for starting reproduction of the received content in response to the download speed of the content being higher than the bitrate of the content.

The one or more programs may further include instructions for requesting the external device to transmit additional content having an identical subject matter as the received content and a bitrate different from the bitrate of the received content in response to the time period during which the buffered content is being greater than the time period taken to receive the content.

The one or more programs may further include instructions for starting reproduction of the received content in response to the time period during which the buffered content is being greater than the time period taken to receive the content.

According to an aspect of an exemplary embodiment, a method of reproducing content received from an external device is controlled by an electronic device and includes receiving content from the external device via a network; buffering the received content; comparing a bitrate of the received content with a status of the network; and determining when to start reproduction of the received content according to a result of the comparing.

The method may further include, when a bitrate of a current bandwidth of the network is higher than the bitrate of the received content, requesting the external device to transmit additional content having an identical subject matter as the received content and having a bitrate different from the bitrate of the received content.

The determining may include starting reproducing of the received content when a bitrate of a current bandwidth of the network is higher than the bitrate of the received content.

The method may further include comparing a time period during which the buffered content is reproducible with a time period taken to receive the content, and determining when to start reproducing of the received content further based on a result of the comparing.

The comparing the time period during which the buffered content is reproducible with the time period taken to receive the content may include determining whether the time period during which the buffered content is reproducible to greater than the time period taken to receive the content; and requesting the external device to transmit additional content having an identical subject matter as the received content and a bitrate different from the bitrate of the received content.

The comparing may include starting reproduction of the received content when the time period during which the buffered content is reproducible to the time period taken to receive the content.

According to an aspect of an exemplary embodiment, a non-transitory computer-readable recording medium has recorded thereon a program for performing a method, controlled by an electronic device, of reproducing content received from an external device in real time, the method including receiving content from an external device via a network; buffering the received content; comparing a bitrate of the received content with a current bitrate of the network; and determining when to start reproduction of the received content according to a result of the comparing.

BRIEF DESCRIPTION OF THE DRAWINGS

The above and/or other aspects will become apparent and more readily appreciated from the following description of exemplary embodiments, taken in conjunction with the accompanying drawings in which:

FIG. 10 is a table showing various buffering times necessary for content reproduction, according to an exemplary embodiment.

DETAILED DESCRIPTION

Figure 1:
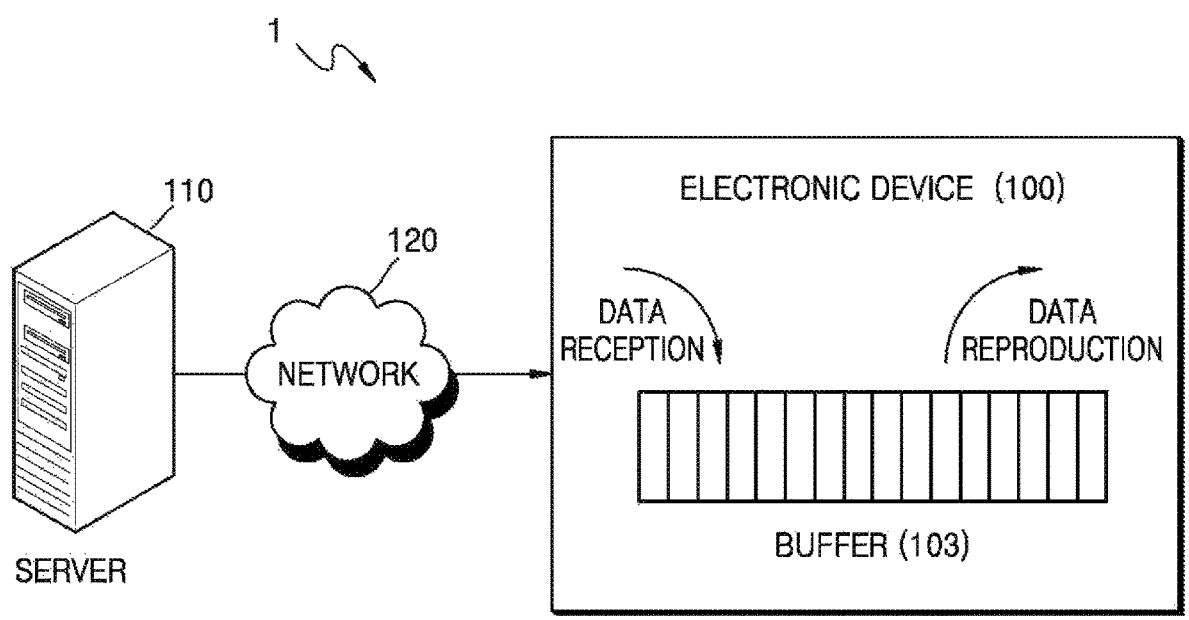
FIG. 1 illustrates a block diagram of a system for a streaming service, according to an exemplary embodiment.

Hereinafter, various example embodiments will be described below with reference to accompanying drawings. However, this is not intended to limit the present disclosure to particular modes of practice, and it is to be appreciated that all modifications, equivalents, and/or alternatives that do not depart from the spirit and technical scope of the disclosure are encompassed in the disclosure. Like reference numerals denote the same elements.

In the present disclosure, it is to be understood that terms such as "including," "having," etc., are intended to indicate the existence of the features (e.g., numbers, functions, operations, or components, such as parts), and are not intended to preclude the possibility that one or more other features may exist or may be added.

As used in the present disclosure, the terms "A or B," "at least one of A and/or B," and "one or more of A and/or B" may include any one of listed items and all of at least one combination of the items. For example, "A or B," "at least one of A and B," or "at least one of A or B" may include (1) at least one A, (2) at least one B, or (3) at least one A and at least one B.

While such terms as "first," "second," etc., may be used to describe various components, such components must not be limited to the above terms. The above terms are used only to distinguish one component from another. For example, a first user device and a second user device may indicate different user devices regardless of an order or an importance. For example, a first component discussed below could be named a second component, and similarly, a second component may be named a first component without departing from the teachings of the present disclosure.

When a component (first component) is "operatively or communicatively coupled with/to" or "connected to" another component (second component), the first component may be connected to the second component directly or through another component (third component). On the other hand, when the first component is "directly coupled with/to" or "directly connected to" the second component, no other component exists between the first and second components.

The expression "configured to (or set to)" used in the present disclosure may be used interchangeably with, for example, "suitable for," "having the capacity to," "designed to," "adapted to," "made to," or "capable of," according to situations. The expression "configured to (or set to)" may not only necessarily refer to "specifically designed to" in terms of hardware. Instead, in some situations, the expression "device configured to" may refer to a situation in which the device is "capable of" together with another device or parts. For example, the phrase "a processor configured to (or set to) perform A, B, and C" may be a dedicated processor (for example, an embedded processor) for performing A, B, and C, or a generic-purpose processor (for example, a central processing unit (CPU) or an application processor (AP)) for performing A, B, and C by executing at least one software program stored in a memory device.

The terms used in the present disclosure are merely used to describe particular example embodiments, and are not intended to limit the present disclosure. An expression used in the singular may encompass the expression of the plural, unless it has a clearly different meaning in the context. Unless otherwise defined, all terms (including technical and scientific terms) used herein have the same meaning as commonly understood by one of ordinary skill in the art to which this disclosure belongs. It will be further understood that terms defined in commonly used dictionaries should be interpreted as having meanings that are the same as or similar to their meaning in the context of the relevant art and will not be interpreted in an idealized or overly formal sense unless expressly so defined herein. In some case, terms defined herein cannot be interpreted to exclude embodiments of the present disclosure.

Electronic devices according to various embodiments may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PDP), an MP3 player, a mobile medical device, a camera, and a wearable device, but is not limited thereto. According to various exemplary embodiments, the wearable device may include at least one of an accessory-type wearable device (e.g., a watch, a ring, a bracelet, an anklet, a necklace), eyeglasses, a contact lens, a head-mounted-device (HMD), a fabric- or clothing-integrated type wearing device (e.g., an electronic dress), a body-attached type wearable device (e.g., a skin pad or a tattoo), and a body implanted type wearable device (e.g., an implantable circuit), but is not limited thereto.

According to some embodiments, the electronic device may be a home appliance. The home appliance may include at least one of, for example, a television (TV), a digital video disc (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync®), a video game console, an electronic dictionary, an electronic key, a camcorder, and an electronic picture frame, but is not limited thereto.

According to other embodiments, the electronic device may include at least one of various medical devices (e.g., various portable medical measuring devices (a blood sugar measuring device, a heartbeat measuring device, a blood pressure measuring device, and a thermometer), magnetic resonance angiography (MRA), magnetic resonance imaging (MRI), computed tomography (CT), and an ultrasonic machine), a navigation device, a global navigation satellite system (GNSS), an event data recorder (EDR), a flight data recorder (FDR), a vehicle infotainment device, marine electronic equipment (e.g., a marine navigation device or a gyro compass), avionics, a security device, a vehicle head unit, industrial or home robots, an automated teller machine (ATM), point of sale (POS), and Internet of things (e.g., a light bulb, various sensors, an electric or gas meter, a sprinkler, a fire alarm, a thermostat, a streetlight, a toaster, sports goods, a hot water tank, a heater, and a boiler), but is not limited thereto.

According to some embodiments, the electronic device may include a part of a furniture or building/structure, an electronic board, an electronic signature receiving device, a projector, and/or various measuring instruments (e.g., a water, electricity, gas, or electric wave measuring device), but is not limited thereto. The electronic device may be a combination of the above-listed devices.

The electronic device may also be a flexible electronic device. The electronic device is not limited to the above-listed devices and may include new electronic devices according to new technical developments.

FIG. 1 illustrates a block diagram of a system 1 for a streaming service, according to an exemplary embodiment.

As shown in FIG. 1, in order for the system 1 to provide a streaming service, a server 110 may transmit content to an electronic device 100 via a network 120. Unlike a downloading method in which all of the content is received first and then reproduction (playback) of the received content starts, a streaming service is performed by receiving from the server 110 only an amount of content which is necessary to reproduce the content in real time. Herein, reproducing/playing the content in real time may mean performing reproduction/playback of the content before the entirety of the content has been received and stored locally. Thus, a portion of the content may still be downloaded and/or buffered while the reproduction/playback is in progress. However, because the speed of receiving content from the server 110 may be different from the speed of reproducing content by the electronic device 100, buffering may be performed so as to seamlessly provide a streaming service.

The electronic device 100 may receive content data for buffering and store the received content data in a buffer 103. The electronic device 100 may read content data from the buffer 103 for reproduction of the content data, and reproduce the content data.

The buffer 103 may be a memory buffer, a disk buffer, and/or a buffer implemented with any storage medium that may function as a buffer.

In the present disclosure, a content download speed refers to a speed at which content or data is received from the server 110, and may be synonymous with a network bandwidth, a network speed, a speed at which content is stored (i.e., written) in a storage unit or the buffer 103, and/or the like. The content download speed may be expressed in bits per second (bit/s, b/s, bps), bytes per second (B/s), baud (Bd), or the like. The content download speed may represent a network speed as measured by the electronic device 100.

In the present disclosure, a content reproduction (playback) speed refers to a rate at which data is processed for each predetermined time period to reproduce (play) content (e.g., video) and represents a speed at which content or data is reproduced (played) in the electronic device 100. The content reproduction speed may be synonymous with content bitrate or a speed of reading content or data from the storage unit or the buffer 103. The content reproduction speed may be expressed in bits per second (bit/s, b/s, bps), bytes per second (B/s), baud (Bd), or the like.

With regard to a streaming system shown as the system 1 in FIG. 1, in order to provide a smooth streaming service, the electronic device 100 may start reproduction of content, after buffering a certain amount of the content to be reproduced before reproduction of the content is started. Because a network condition may constantly change, reproduction may be interrupted even when the electronic device 100 provides a streaming service by performing buffering before starting reproduction. Accordingly, if the reproduction is stopped, the electronic device 100 may provide a streaming service by buffering a certain amount of the content before reproduction is resumed. In the present disclosure, "before starting reproduction" may include "before starting reproduction for the first time" or "before resuming reproduction after the reproduction was stopped."

However, while buffering is being executed, a user may have to wait in a state in which reproduction is stopped. Thus, the number of times reproduction is stopped and buffering is generated needs to be minimized. A method of minimizing buffering is to buffer all content to be reproduced before starting reproduction. However, buffering entire content to be reproduced before starting reproduction is not different from a downloading method, and in this case, a user needs to wait until all the content is buffered. Accordingly, an amount of data to be buffered needs to be determined so that the number of times reproduction is stopped and buffering is generated may be minimized and a wait time for the user may be minimized.

The electronic device 100 may set an optimized buffering amount. When the amount of buffered content is equal to or greater than the predetermined buffering amount, the electronic device 100 may start reproducing content. Alternatively, when a time period during which the buffered content is reproducible is equal to or greater than predetermined time duration, the electronic device 100 may start reproducing content. The electronic device 100 may determine a content reproduction starting time point, based on a content reproduction speed and a network speed.

Figure 2:
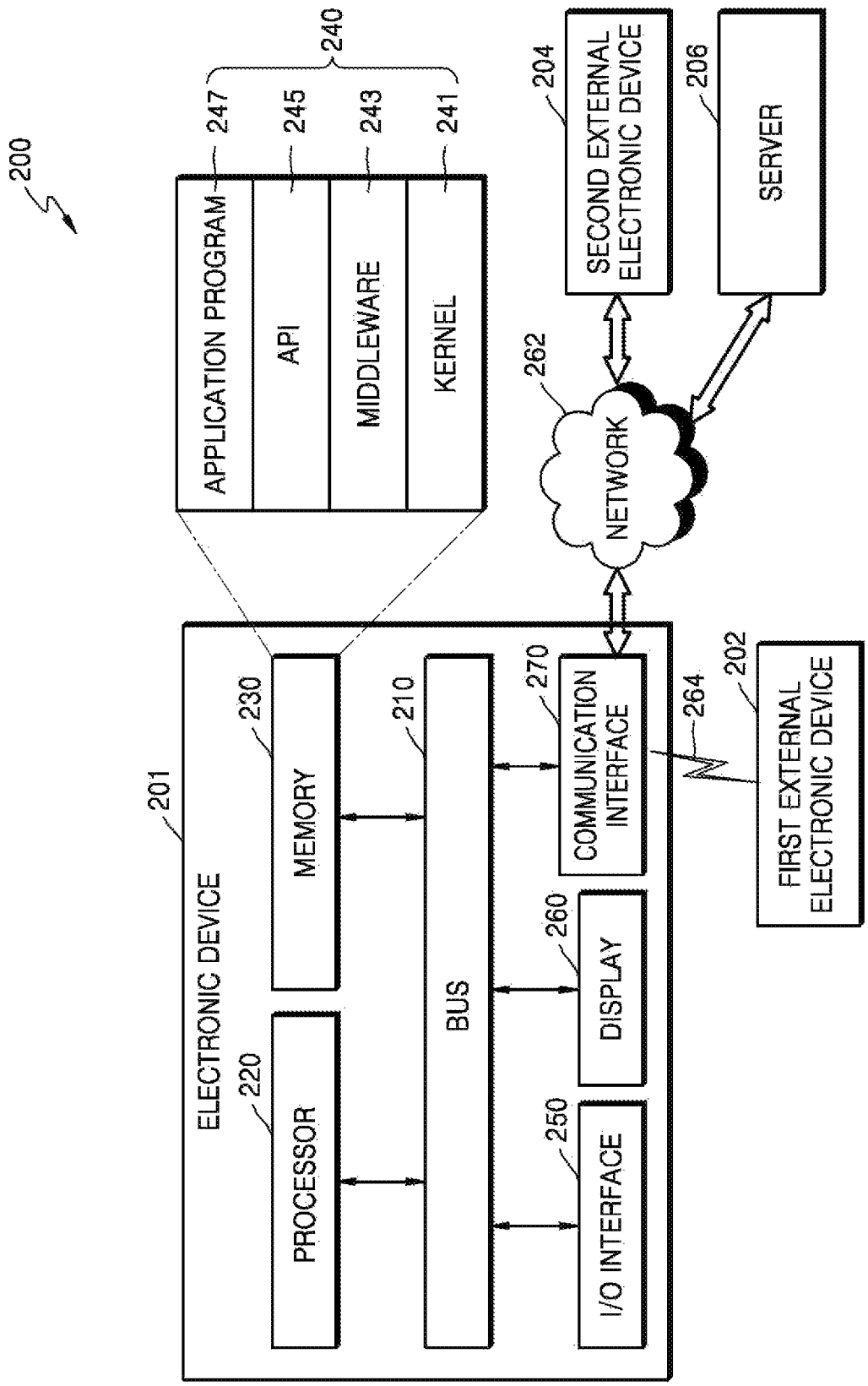
FIG. 2 is a schematic diagram of an electronic device in a network environment, according to an exemplary embodiment.

FIG. 2 is a block diagram of an electronic device 201 in a network environment 200, according to an exemplary embodiment. The above-described streaming service may be implemented in the network environment 200 of FIG. 2. The network environment 200 may include the network 120 of FIG. 1. The electronic device 201 may be the electronic device 100 of FIG. 1.

As shown in FIG. 2, the electronic device 201 may include a bus 210, a processor 220, a memory 230, an input/output (I/O) interface 250, a display 260, and a communication interface 270. According to an exemplary embodiment, the electronic device 201 may not include one or more of the above components or may include other additional components.

The bus 210 may, for example, connect the processor 220, the memory 230, the I/O interface 250, the display 260, and/or the communication interface 270 to each other. The bus 210 may include a circuit for transmitting and receiving information (e.g., a control message and/or data) to and from the processor 220, the memory 230, the I/O interface 250, the display 260, and the communication interface 270.

The processor 220 may include one or more of a central processing unit (CPU), an application processor (AP), and/or a communication processor (CP). The processor 220 may control at least one component of the electronic device 201 and/or execute an operation related to communication or a data process.

The processor 220 may execute at least one program stored in the memory 230. The processor 220 may buffer content received via a network 262, reproduce the buffered content in real time, compare a status of the network 262 with a bitrate of the content, and determine when to start reproduction of the content, based on a result of the comparison. For example, the processor 220 may compare a content download speed with a bitrate of the received content, and, when the content download speed is higher than the bitrate of the received content, the processor 220 may start reproduction of the content.

The processor 220 may compare a time period during which the buffered content is reproducible with a time period taken to receive the buffered content, and thus may determine when to start reproduction of the content. For example, when the time period during which the buffered content is reproducible is greater than the time period taken to receive the buffered content, the processor 220 may start reproduction of the content.

The memory 230 may be a volatile and/or nonvolatile memory. The memory 230 may store, for example, a command or data related to at least one component of the electronic device 201. According to an example embodiment, the memory 230 may store software and/or a program 240. The program 240 may include, for example, a kernel 241, middleware 243, an application programming interface (API) 245, and/or an application program (i.e., an application) 247. At least some of the kernel 241, the middleware 243, and the API 245 may be referred to as an operating system (OS).

The kernel 241 may, for example, control or manage system resources (e.g., the bus 210, the processor 220, and the memory 230) used to execute an operation or a function realized in other programs (e.g., the middleware 243, the API 245, and the application program 247). The kernel 241 may provide an interface for controlling or managing the system resources, as the middleware 243, the API 245, or the application program 247 accesses individual components of the electronic device 201.

The middleware 243 may, for example, operate as a relay for the API 245 or the application program 247 to communicate with the kernel 241 to exchange data.

In addition, the middleware 243 may process at least one operation request received from the application program 247 according to a priority. For example, the middleware 243 may assign, to at least one operation request received from the application program 247, a priority of using the system resources (e.g., the bus 210, the processor 220, or the memory 230) of the electronic device 201. For example, the middleware 243 may process the operation requests according to the assigned priority to perform scheduling or load balancing with respect to the operation requests.

The API 245 is, for example, an interface enabling the application program 247 to control functions provided by the kernel 241 or the middleware 243, and for example, may include at least one interface or function (e.g., command) for controlling a file, controlling a window, processing an image, or controlling a character.

The I/O interface 250 may operate, for example, as an interface capable of transmitting a command or data input from a user or an external device to at least one of the components of the electronic device 201. Also, the I/O interface 250 may output a command or data received from at least one of the components of the electronic device 201 to the user or an external device.

The display 260 may be implemented with, for example, a liquid crystal display (LCD), a light-emitting diode (LED) display, an organic light-emitting diode (OLED) display, a microelectromechanical systems (MEMS) display, an electronic paper display, etc. but is not limited thereto. The display 260 may display, for example, various types of content (for example, text, an image, a video, an icon, or a symbol) to the user. The display 260 may include a touch screen, and for example, may receive a touch, gesture, proximity, or hovering input using an electronic pen or a part of the body of the user. The display 260 may display content in real time.

The communication interface 270 may establish communication between the electronic device 201 and an external device (e.g., a first external electronic device 202, a second external electronic device 204, or a server 206). For example, the communication interface 270 may communicate with an external device (e.g., the second external electronic device 204 or the server 206) through a network 262 via wired or wireless communication.

The communication interface 270 may receive content from the external device or the server connected to the network 262. The communication interface 270 may receive, from the external device or the server, one of first content item and second content item that include the same content but have different bit rates. The bit rates as described herein may refer to an encoding bit rate, which is a number of bits used per unit of reproduction/playback time to represent a continuous streaming medium such as an audio or a video.

The wireless communication may use, for example, cellular communication protocols, such as long-term evolution (LTE), LTE advance (LTE-A), code division multiple access (CDMA), wideband CDMA (WCDMA), universal mobile telecommunications system (UMTS), wireless broadband (WiBro), and/or global system for mobile communications (GSM). Also, the wireless communication may include short-range communication 264. The short-range communication 264 may include, for example, Wi-Fi, Bluetooth, near-field communication (NFC), and/or global navigation satellite system (GNSS). The GNSS may include, according to regions or bandwidths, at least one of global positioning system (GPS), Glonass (Russian global navigation satellite system), Beidou navigation satellite system (BDS), and Galileo system (European global satellite-based navigation system). Herein, "GPS" and "GNSS" may be interchangeably used. The wired communication may include universal serial bus (USB), High-Definition Multimedia Interface (HDMI), recommended standard 232 (RS-232), and/or plain old telephone service (POTS). The network 262 may include telecommunications networks, such as a computer network, a local area network (LAN), a wide area network (WAN), the Internet, and/or a telephone network.

Each of the first and second external electronic devices 202 and 204 may be the same type as or a different type from the electronic device 201. According to an example embodiment, the server 206 may include a group of one or more servers. According to some embodiments, some or all of the operations performed by the electronic device 201 may be performed by one or more electronic devices (e.g., the first and second external electronic devices 202 and 204), or the server 206. According to an exemplary embodiment, when the electronic device 201 needs to perform a function or service automatically or upon a request, the electronic device 201 may, instead of or in addition to executing the function or the service, request another device (e.g., the first or second external electronic device 202 or 204 or the server 206) to perform at least some of related functions or services. The other device (e.g., the first or second external electronic device 202 or 204 or the server 206) may perform a requested or additional function, and transmit a result of performing the requested or additional function to the electronic device 201. Then, the electronic device 201 may provide the received result without changes or provide a requested function or service by additionally processing the received result. To this end, for example, a cloud computing technology, a distributed computing technology, or a client-server computing technology may be used.

Figure 3:
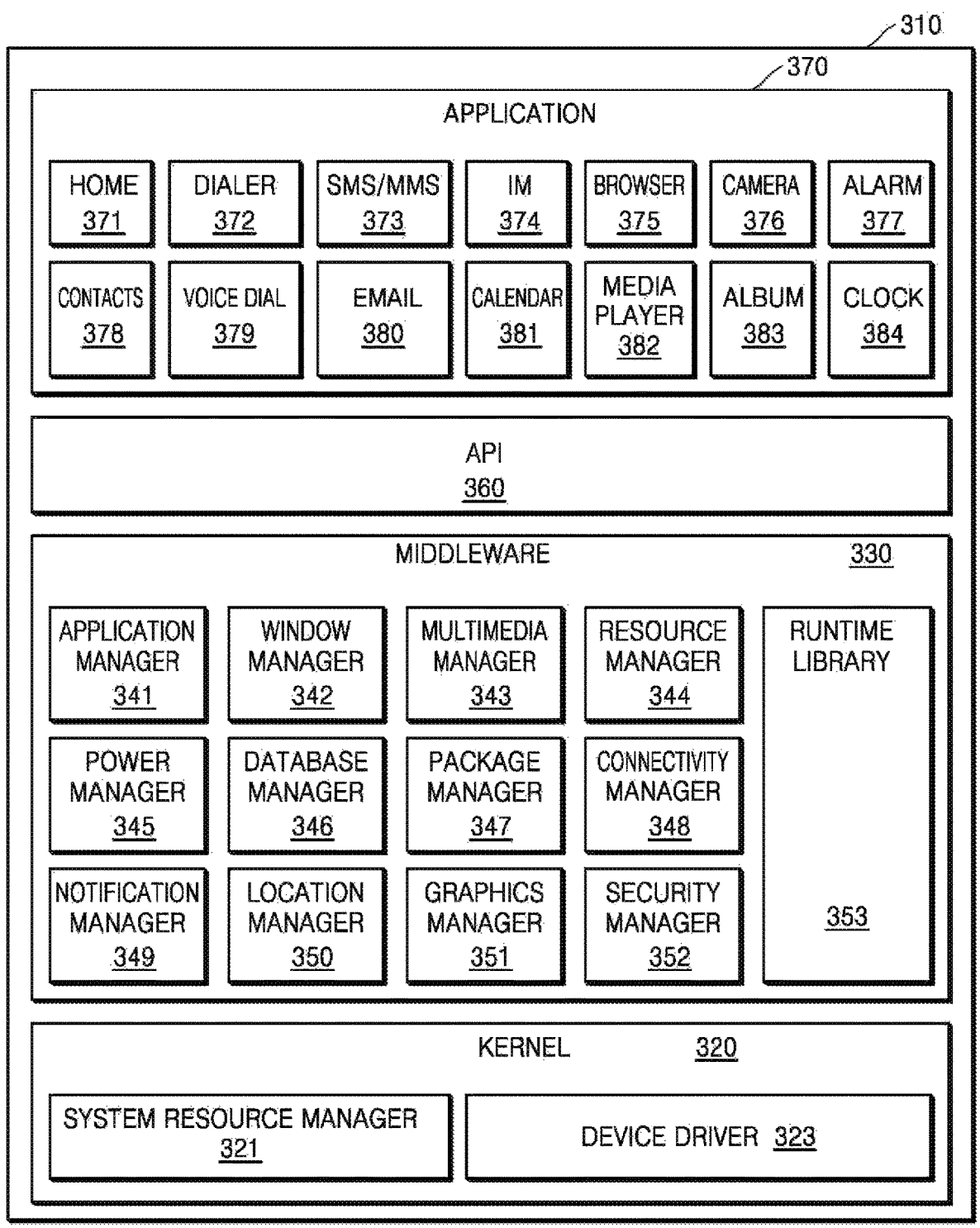
FIG. 3 is a block diagram of a program module according to an exemplary embodiment.

FIG. 3 is a block diagram of a program module 310 according to an exemplary embodiment. The above-described streaming service may be implemented using the program module 310 included in the electronic device 100.

As shown in FIG. 3, the program module 310 (e.g., the program 240) may include an OS that controls resources related to the electronic device 201 and/or various applications (e.g., the application program 247) driven on the OS. The OS may be, for example, Android, iOS, Windows, Symbian, Tizen, or Bada.

The program module 310 may include a kernel 320, a middleware 330, an API 360, and/or an application 370. At least a part of the program module 310 may be pre-loaded on the electronic device or downloaded from an external electric device (e.g., the first or second external electronic device 202 or 204, or the server 206).

The kernel 320 (e.g., the kernel 241) may include a system resource manager 321 and/or a device driver 323. The system resource manager 321 may control, assign, or recover a system resource. According to an exemplary embodiment, the system resource manger 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may provide a function commonly required by the application 370 or may provide various functions to the application 370 through the API 360 such that the application 370 efficiently uses limited system resources of an electronic device. According to an exemplary example embodiment, the middleware 330 (e.g., the middleware 243) may include a runtime library 353, an application manger 341, a window manager 342, a multimedia manager 343, a resource manager 344, a power manager 345, a database manager 346, a package manager 347, a connectivity manager 348, a notification manager 349, a location manager 350, a graphics manager 351, and/or a security manager 352.

The runtime library 353 may include, for example, a library module that is used by a compiler in order to additionally include a new function via a programming language while the application 370 is being executed. The run time library 353 may perform I/O management, memory management, or an arithmetic function. The application manager 341 may manage, for example, a life cycle of at least one of the application 370. The window manager 342 may manage graphical user interface (GUI) resources that are used on a screen.

The multimedia manager 343 may ascertain a format necessary for reproduction or playback of various media files, and may perform encoding or decoding on the media files by using a codec suitable for the format. The multimedia manager 343 may also perform encoding or decoding on content received in the above-described streaming system. The multimedia manager 343 may select content that is to be received by the server, based on the network status. This will be described later in detail.

The resource manager 344 may manage resources, such as source code, memory, or storage space of the at least one application among the applications 370. The power manager 345 may manage a battery or a power supply by operating together with a basic input/output system (BIOS) and may provide power information and the like necessary for operating the electronic device. The database manager 346 may generate, search, or change a database that is to be used by the at least one application among the applications 370.

The package manager 347 may install or update applications distributed in the form of a package file. The connectivity manager 348 may manage wireless connection, such as Wi-Fi or Bluetooth. The notification manager 349 may indicate or notify about an event (e.g., an arrival message, a scheduled appointment, or a proximity notice) in such a way that a user is not interrupted.

The location manager 350 may manage location information of the electronic device.

The graphics manager 351 may manage a graphical effect that is to be provided to the user, or a user interface related with the graphical effect. The security manager 352 may provide all security functions necessary for system security or user authentication. According to an embodiment, when the electronic device (e.g., the electronic device 101) includes a telephone function, the middleware 330 may further include a telephony manager for managing an audio or video call function of the electronic device.

The middleware 330 may include a middleware module forming a combination of various functions of the above components. The middleware 330 may provide a specialized module according to types of OS to provide differentiated functions. Also, the middleware 330 may dynamically delete some of the components or add a new component.

The API 360 (e.g., the API 245) is, for example, a group of API programming functions, and may be provided in different configurations according to different OSs. For example, in case of Android or iOS, one API set may be provided according to platform, and in case of Tizen, at least two API sets may be provided according to platform.

The application 370 (e.g., the application program 247) may include at least one application capable of performing functions, such as a home function 371, a dialer function 372, a short message service (SMS)/multimedia messaging service (MMS) function 373, an instant message (IM) function 374, a browser function 375, a camera function 376, an alarm function 377, a contacts function 378, a voice dial function 379, an email function 380, a calendar function 381, a media player function 382, a photo album function 383, a clock function 384, a healthcare function (e.g., monitoring an exercise or an amount of blood sugar), and an environment information providing function (e.g., atmospheric pressure, humidity, or temperature).

According to an exemplary embodiment, the media player 382 may reproduce/play content received by one of the above-described streaming systems. For example, the media player 382 may read and reproduce/play the content data stored in the buffer 103.

The application 370 may support information exchange between the electronic device (e.g., the electronic device 100) and the external electronic device (e.g., the first or second external electronic device 202 or 204) (hereinafter, referred to as an "information exchange application" for convenience of description). The information exchange application may include, for example, a notification relay application for transmitting certain information to the external electronic device or a device management application for managing the external electronic device.

For example, the notification relay application may include a function of relaying notification information generated by another application of the electronic device (e.g., an SMS/MMS application, an e-mail application, a healthcare application, or an environmental information application) to the external electronic device (e.g., the electronic device 202 or 204). The notification relay application may receive the notification information from the external electronic device and may provide the received notification information to the user.

The device management application may manage (e.g., install, delete, or update) at least one function of the external electronic device (e.g., the external electronic device 202 or 204) communicating with the electronic device. Examples of the at least one function include powering on/off the external electronic device (or some of the components thereof), adjusting brightness or resolution, adjusting a display, and operating an application in the external electronic device or a service provided by the external electronic device (e.g., a calling service or a message service).

According to an exemplary embodiment, the application 370 may be an application (e.g., a health management application of a mobile medical device) assigned according to attributes of the external electric device (e.g., the first or second external electronic device 202 or 204). The application 370 may include an application received from the external electronic device (e.g., the server 206 or the first or second external electronic device 202 or 204). The application 370 may be a preloaded application or a third party application downloaded from a server. Names of the components of the program module 310 may vary according to a type of OS.

According to some exemplary embodiments, the various components shown in FIG. 3 and other figures, including the program module 310 of FIG. 3, may be implemented with software, firmware, hardware, or a combination thereof. At least a part of the program module 310 may be implemented (i.e., executed) by a processor, such as the processer 220. At least a part of the program module 310 may include a module, a program, a routine, a set of instructions, or a process to perform at least one function.

Figure 4:
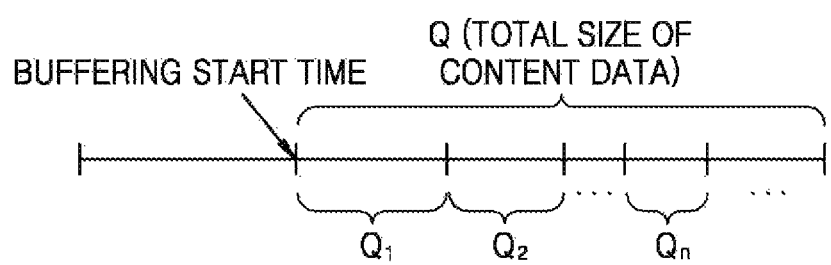
FIG. 4 is a diagram for explaining a concept of buffering, according to an exemplary embodiment.

FIG. 4 is a diagram for explaining a concept of buffering according to an exemplary embodiment. The buffering shown in FIG. 4 may be implemented in the above-described streaming system.

In FIG. 4, the horizontal line represents a total size of content data expressed as a bitstream. In the present disclosure, a total size of content data may be the total amount of un-reproduced/unplayed content data. For example, the total size of content data may coincide with a file size of the corresponding content data.

A buffering start time refers to a point of time when data that is stored in a buffer is completely exhausted during reproduction, and thus additional buffering is needed, or a point of time when buffering is necessary before the reproduction of the content may be initiated. Given that content to be received from a buffering start time is Q, Q may represent a total size of content.

In order to provide a smooth streaming service, if buffering is necessary before content reproduction is started, an amount of data to be buffered needs to be determined and then received to start the reproduction of the content. In FIG. 4, Q1 corresponds to an amount of data to be buffered. The electronic device 100 may start reproduction after buffering an amount Q1.

Q2 corresponds to an amount of content data that is received from a network while the Q1 amount of buffered content data is being reproduced. Likewise, Q3 corresponds to an amount of content data that is received from the network while the Q2 amount of content data is being reproduced. Such a process may be repeated until reproduction of the entire content data is performed.

As described above, in a streaming service, when the electronic device 100 receives data of a certain amount or more from a server, content reproduction may start. A method of starting content reproduction based on a data receiving environment even when the electronic device 100 does not receive data of a certain amount or more from a server, according to an embodiment of the present disclosure, will now be described.

Figure 5:
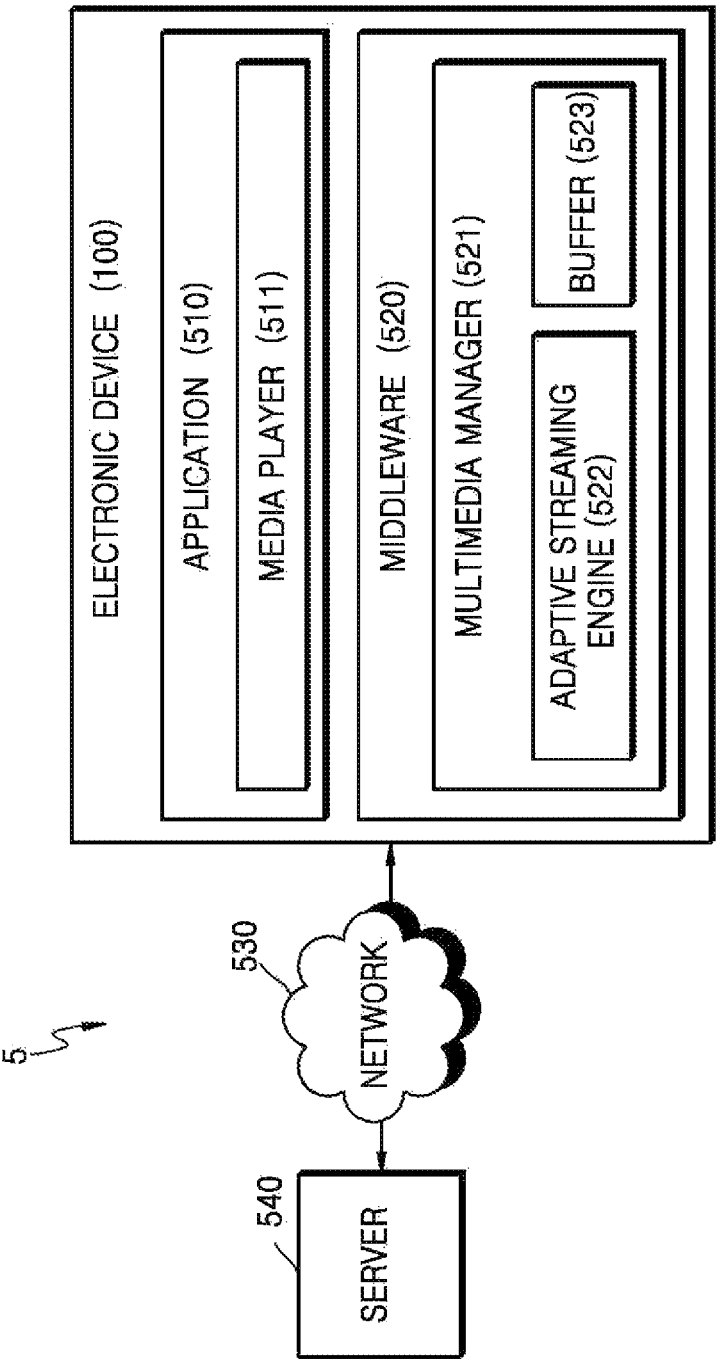
FIG. 5 is a block diagram of a streaming system in which an electronic device starts content reproduction based on a data download speed, according to an exemplary embodiment.

FIG. 5 is a block diagram of a streaming system 5 in which an electronic device starts content reproduction by comparing a data download speed with a bitrate of the content, according to an exemplary embodiment.

As shown in FIG. 5, an electronic device 100 may include a media player 511 as part of an application 510. The media player 511 may be the media player 382 of FIG. 3. The electronic device 100 may include a multimedia manager 521, which is part of middleware 520. The multimedia manager 521 may be the multimedia manager 343 of FIG. 3.

The media player 511 is a program capable of reproducing multimedia content. For example, the media player 511 may be, for example, a webpage displayed inside a browser that reproduces multimedia content, or a video player.

The multimedia manager 521 may include an adaptive streaming engine 522 and a buffer 523. However, embodiments are not limited thereto, and the multimedia manager 521 may include other components necessary for media reproduction, such as a multiplexer, a demultiplexer, an encoder, etc.

The adaptive streaming engine 522 may continuously check a network bandwidth status between a server 540 and the electronic device 100 while receiving content from the server 540, in order to receive content that is suitable for a situation of a network 530.

Accordingly, the adaptive streaming engine 522 may diversify a service quality by selecting suitable content according to a network speed. The adaptive streaming engine 522 may improve a network bandwidth and stability of a streaming service.

The adaptive streaming engine 522 may be, for example, a standard Hypertext Transfer Protocol (HTTP)-based streaming protocol. The adaptive streaming engine 522 may transmit streaming data, a file containing a content reproduction list, and a plurality of files including content, to the electronic device 100 via HTTP.

In the adaptive streaming engine 522, because the server 540 is merely required to receive a data download or streaming request from the electronic device 100 via HTTP and respond to the request, any web server capable of reading a stored file and sending data via an HTTP response may be used as the sever 540.

The server 540 may split media data into multiple files at regular time intervals and may generate metadata capable of accessing the files. The metadata may be the aforementioned content reproduction list.

In the adaptive streaming engine 522, the server 540 may include a metadata file that may be representative of the entire content. The representative metadata file may include respective playlist files for bitrates. A playlist file for each bitrate may include a plurality of split (i.e., fragmented) video files corresponding to each bitrate.

Accordingly, the adaptive streaming engine 522 may diversify a service quality by selecting suitable content according to a network speed between the server 540 and the electronic device 100.

When a device transmits data to another device, the buffer 523 may be used to decrease the performance gap between the two devices by compensating for a difference between data transmission speeds or processing speeds of the two devices. In general, during data transmission or reception between a CPU and a terminal or another I/O device, a buffer may be used as an I/O region. The server 540 may store various types of content, for example, videos, still images, and documents. In the streaming system 5, the server 540 may store several pieces of content having different capacities with respect to an identical type of content.

The server 540 may duplicate and store a single video file into a plurality of video files having the same content but having different bitrates. Because a video includes more information as its bitrate increases, an image quality may improve. However, as the bitrate increases, the size of the video file also increases. For example, a video file having a bitrate of 500 kbps may have a file size of 450 kb, another video file of the same content but having a bitrate of 2,000 kbps may have a file size of 1,770 kb, and yet another video file having a bitrate of 6,000 kbps may have a file size of 5,200 kb.

The electronic device 100 may selectively request the server 540 for a video having a low bitrate or a video having a high bitrate according to various situations and network conditions, and may receive the requested video from the server 540.

With regard to the streaming system 5 of FIG. 5, the media player 511 may start reproducing the content when a certain amount of data is received from the server 540. For example, the media player 511 may start reproducing content when the amount of data buffered from the server 540 is equal to or greater than 10 MB or a time period during which the buffered data is reproducible is equal to or greater than 10 seconds.

The adaptive streaming engine 522 may selectively receive content from the server 540 or request the media player 511 to reproduce the received content, according to a situation of the network 530. The buffer 523 may selectively receive content from the server 540 or request the media player 511 to reproduce the received content, based on the amount of the received data and a time period during which data is received.

The operations of the adaptive streaming engine 522 and the buffer 523 requesting for reproduction of received content will now be described in detail.

Figure 6:
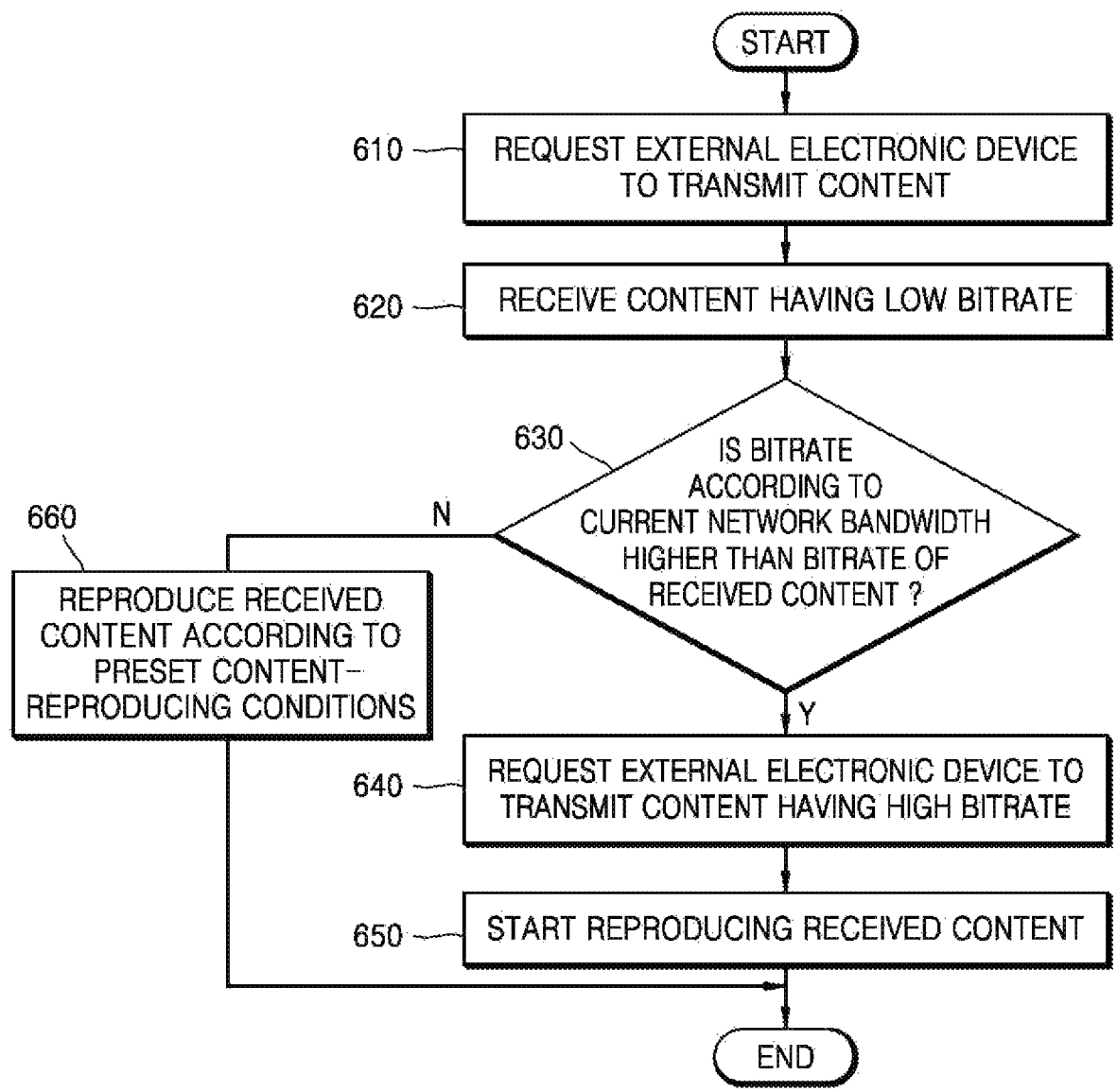
FIG. 6 is a flowchart of a method, performed by an electronic device, of reproducing received content according to a network status, according to an exemplary embodiment.

FIG. 6 is a flowchart of a method, performed by the electronic device 100, of reproducing received content according to a network status, according to an exemplary embodiment.

In operation 610, the electronic device 100 may request an external electronic device (e.g., the server 540) to transmit content. The content may be streamed to the electronic device 100. When content having a size equal to or greater than a threshold size is received or available reproduction time for the received content is equal to or greater than a threshold time duration, the electronic device 100 may start reproducing the received content. However, embodiments are not limited thereto.

In operation 620, the electronic device 100 may receive content having a low bitrate. The received content may be stored in the buffer 523. In operation 630, the electronic device 100 may compare a bitrate (e.g., encoding rate) of the received content with a bitrate (e.g., data transfer rate) of a current network bandwidth. In operation 640, when the bitrate of the current network bandwidth is higher than the bitrate of the received content, the electronic device 100 may request the server 540 to transmit content having a high bitrate. In operation 660, when the bitrate according to the current network bandwidth is not higher than the bitrate of the received content, the electronic device 100 may reproduce the received content according to a predetermined content-reproducing (playback) conditions.

In operation 650, when the electronic device 100 receives the content having a high bitrate from the server 540, the electronic device 100 may start plying the received content. In other words, even when the size of the content is less than the threshold size and even when the available reproduction time for the received content is less than the threshold time duration, the electronic device 100 may start reproducing the received content.

Figure 7:
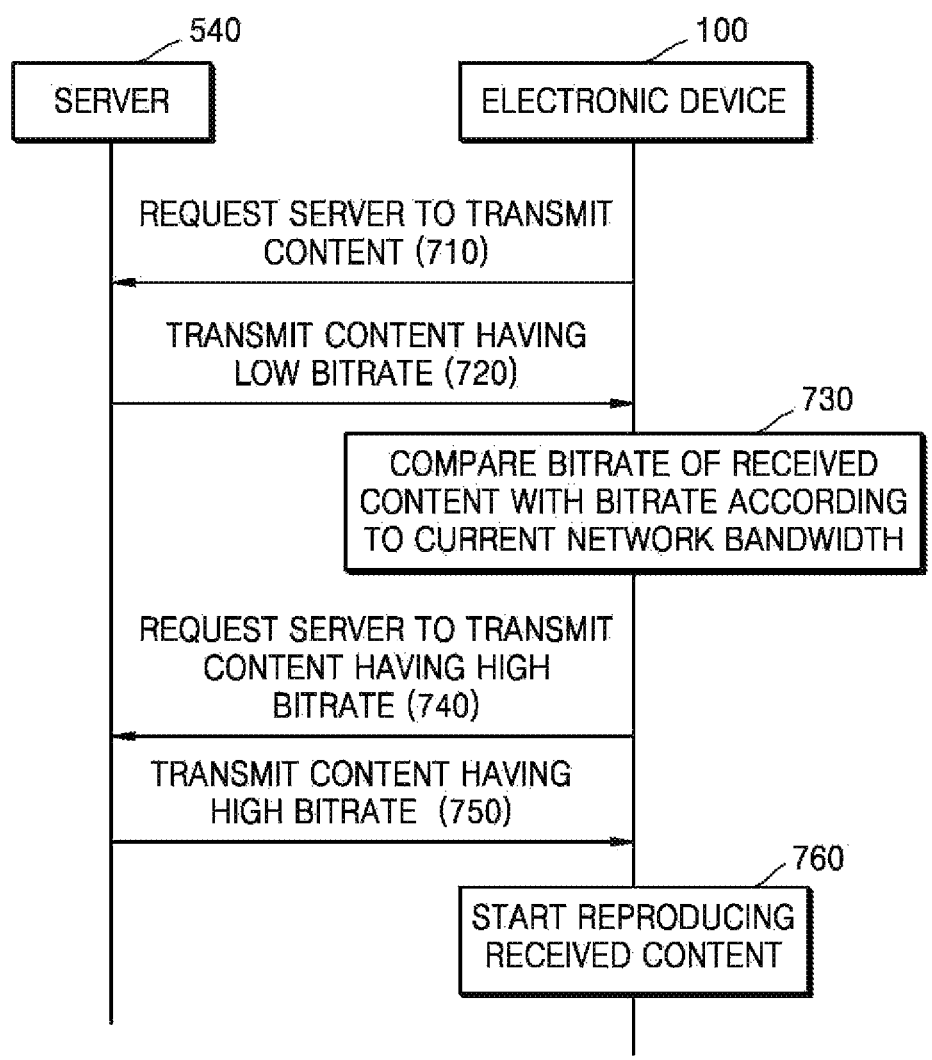
FIG. 7 is a flowchart of a method, performed by an electronic device, of playing received content according to a network status when the electronic device and a server transmit or receive content to or from each other, according to an exemplary embodiment.

FIG. 7 is a flowchart of a method, performed by the electronic device 100, of reproducing received content according to a network status when the electronic device 100 and the server 540 transmit or receive content to or from each other, according to an exemplary embodiment.

In operation 710, the electronic device 100 may request the server 540 to transmit content. In operation 720, in response to the request from the electronic device 100, the server 540 may transmit content having a low bitrate to the electronic device 100. The content may be transmitted in a streaming form (i.e., simultaneous downloading and reproduction/playback) as described above with reference to FIG. 4.

In operation 730, the electronic device 100 may compare a bitrate of the received content with a bitrate of a current network bandwidth. In operation 740, when the bitrate of the current network bandwidth is higher than the bitrate of the received content, the electronic device 100 may request the server 540 to transmit content having a higher bitrate.

In operation 750, the server 540 may transmit, to the electronic device 100, content that is the same as the transmitted content in terms of contents but has a higher bitrate than the transmitted content. In operation 760, even when conditions for reproducing streaming content are not satisfied, the electronic device 100 may start reproducing the received content.

Figure 8:
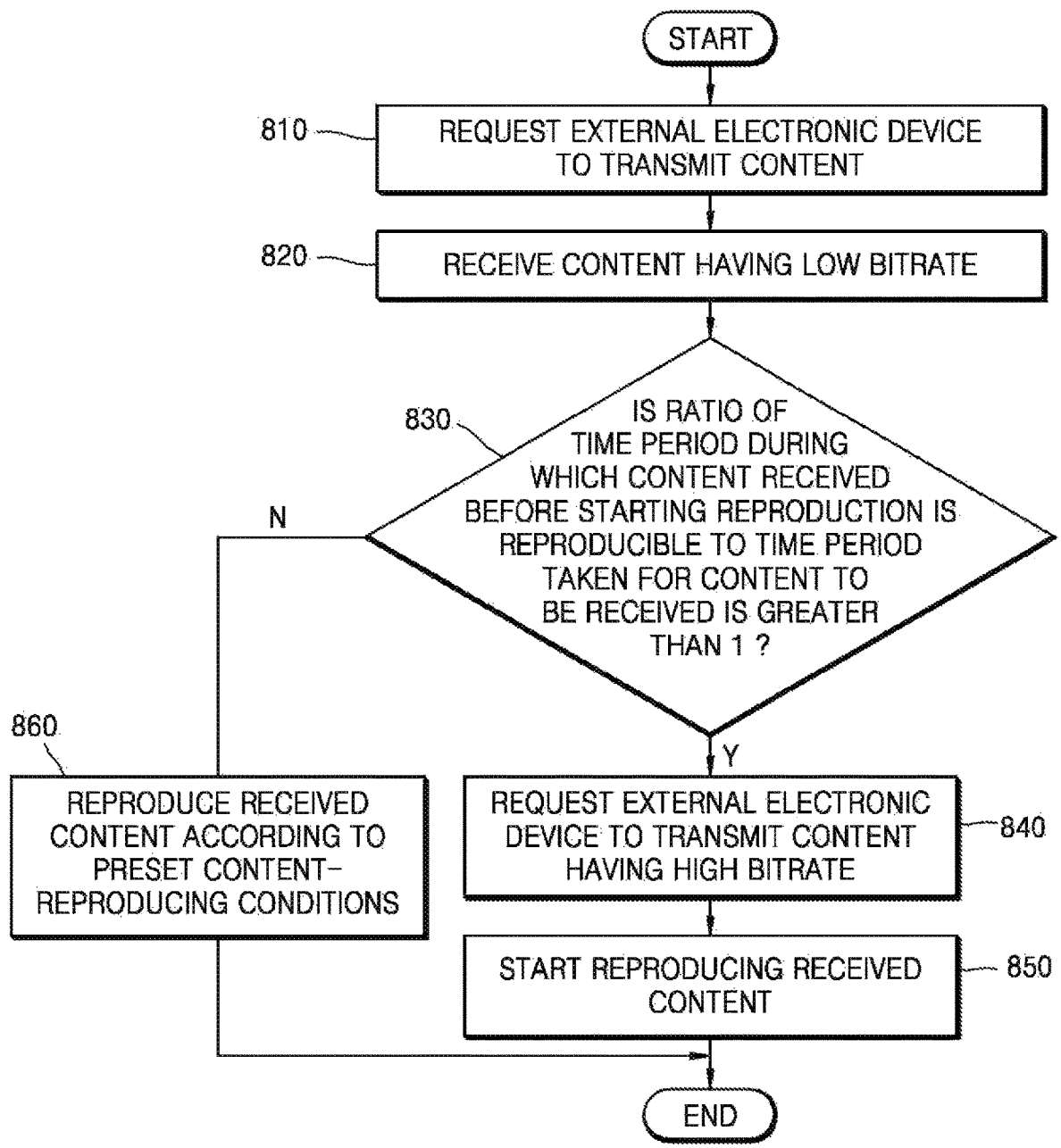
FIG. 8 is a flowchart of a method, performed by an electronic device, of reproducing received content according to the capacity of received content and a time period taken for content to be received, according to an embodiment of the present disclosure.

FIG. 8 is a flowchart of a method, performed by the electronic device 100, of reproducing received content according to a size of the received content and a download time of the received content, according to an exemplary embodiment.

In operation 810, the electronic device 100 may request an external electronic device (e.g., the server 540) to transmit content. The content may be streamed to the electronic device 100. The electronic device 100 may set reproduction of the received content to start when content having a size equal to or greater than a threshold size is received (e.g., the data amount of buffered content is equal to or greater than the threshold value) or when available reproduction time for the received content is equal to or greater than a threshold time duration (e.g., a time period during which buffered content is reproducible is equal to or greater than the threshold value). However, embodiments are not limited thereto.

In operation 820, the electronic device 100 may receive content having a low bitrate. The received content may be stored in the buffer 523. In operation 830, the electronic device 100 may calculate a ratio of a time period during which content received before starting reproduction is reproducible and a time period taken for the content to be received. For example, when the ratio is greater than 1, this may mean that new content data may be stored in the buffer 532 before all of the content data stored in the buffer 532 is reproduced. In operation 840, when the ratio is greater than 1, the electronic device 100 may request the server 540 to transmit content having a high bitrate. In operation 860, when the ratio is less than 1, the electronic device 100 may reproduce the received content according to predetermined content-reproducing conditions.

In operation 850, when the electronic device 100 receives the content having a high bitrate from the server 540, the electronic device 100 may start reproducing the received content. In other words, even when the size of the content is less than the threshold size and even when the available reproduction time for the received content is less than the threshold time durtion, the electronic device 100 may start reproducing the received content.

Figure 9:
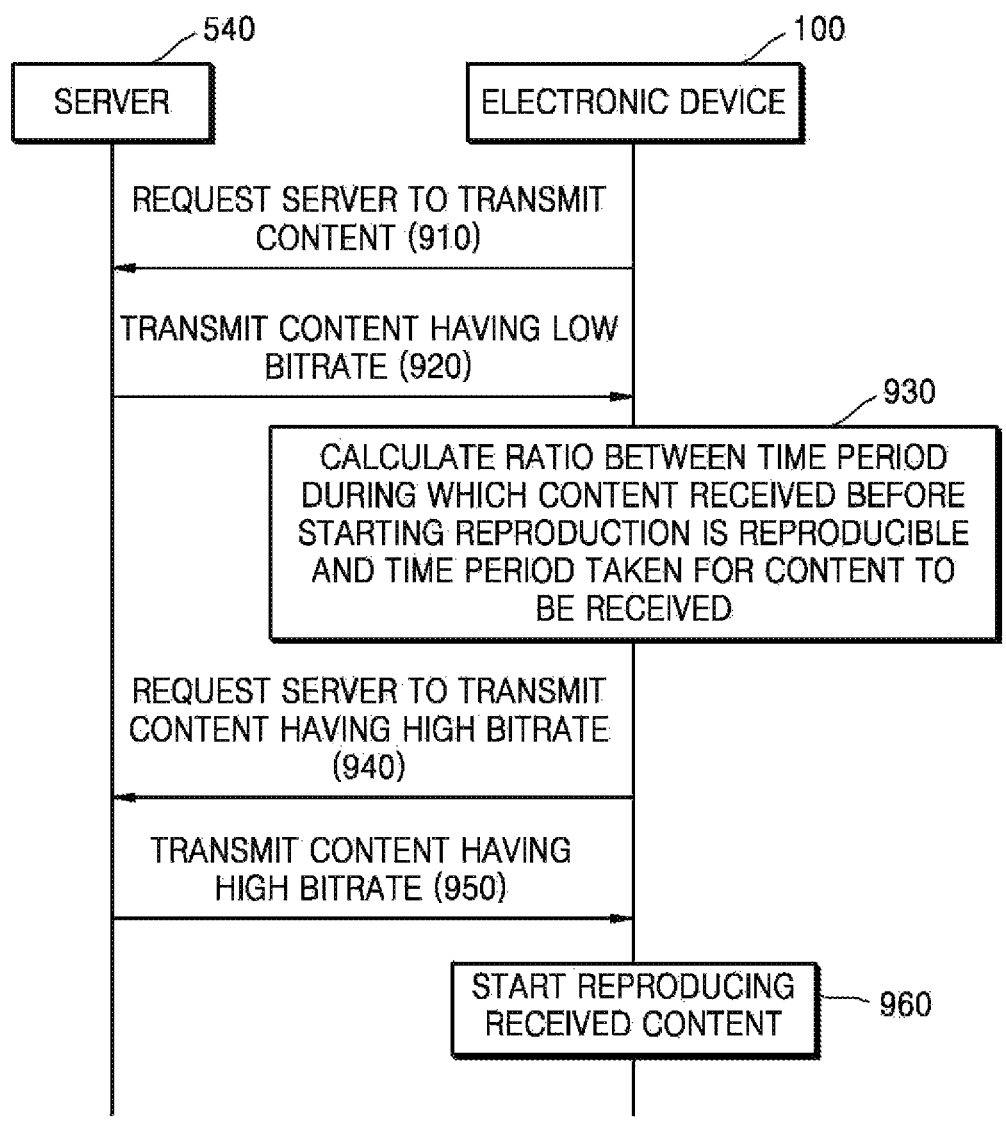
FIG. 9 is a flowchart of a method, performed by an electronic device, of reproducing received content according to a download time of the received content, when the electronic device and a server transmit or receive content to or from each other, according to an exemplary embodiment.

FIG. 9 is a flowchart of a method, performed by the electronic device 100, of reproducing received content according to the download time of the received content, when the electronic device 100 and the server 540 transmit or receive content to or from each other, according to an exemplary embodiment.

In operation 910, the electronic device 100 may request the server 540 to transmit content. In operation 920, in response to the request from the electronic device 100, the server 540 may transmit content having a low bitrate to the electronic device 100. The content may be transmitted in a streaming form (i.e., simultaneous downloading and reproduction/playback) as described above with reference to FIG. 4.

In operation 930, the electronic device 100 may calculate a ratio of the time period during which content received before starting reproduction is reproducible and the time period taken for the content to be received (i.e., download time). In operation 940, when the ratio is greater than 1, the electronic device 100 may request the server 540 to transmit content having a high bitrate.

In operation 950, the server 540 may transmit, to the electronic device 100, identical content having a higher bitrate than the previously transmitted content. In operation 960, even when conditions for reproducing streaming content are not satisfied, the electronic device 100 may start reproducing the received content.

As described above, the electronic device 100 determining whether to start reproducing the received content by comparing the bitrate of the received content with the bitrate of a current network bandwidth or comparing the time period during which the received content is reproducible with the time period taken for the content to be received is applicable to both when one of a condition regarding the bitrates and a condition regarding the time periods is satisfied and when both of the conditions are satisfied.

FIG. 10 is a table showing various buffering times necessary for content reproduction according to an exemplary embodiment.

In FIG. 10, changes in a buffering time necessary for starting reproduction according to a comparative example are shown according to a protocol type. In this example, when the protocol type is HTTP, buffering times necessary for starting reproduction according to a comparative example (i.e., using a related art method) and an exemplary embodiment of the present disclosure are 3.3065 seconds and 0.7427 seconds, respectively. According to an exemplary embodiment of the present disclosure, a 77.5% reduction in buffering time was observed as compared with the conventional method.

When the protocol type is HTTP Live Streaming (HLS), buffering times necessary for starting reproduction according to a comparative example and an exemplary embodiment of the present disclosure are 4.3592 seconds and 0.3925 seconds, respectively. Thus, according to an exemplary embodiment of the present disclosure, a 90.9% reduction in buffering time was achieved as compared with the related art method. When the protocol type is Smooth, buffering times necessary for starting reproduction according to a comparative example and an exemplary embodiment of the present disclosure are 2.0897 seconds and 0.6133 seconds, respectively. Thus, according to an exemplary embodiment of the present disclosure, a 70.6% reduction in buffering time was achieved as compared with the related art method.

When the protocol type is WV, buffering times necessary for starting reproduction according to a comparative example and an exemplary embodiment of the present disclosure are 3.4065 seconds and 0.9427 seconds, respectively. According to an exemplary embodiment of the present disclosure, a 72% reduction in buffering time was achieved as compared with the related art method.

As such, according to an exemplary embodiment of the present disclosure, the electronic device 100 may achieve reduction in standby time required for a user to watch a streaming video by decreasing the time needed to start reproducing content.

Figure 11:
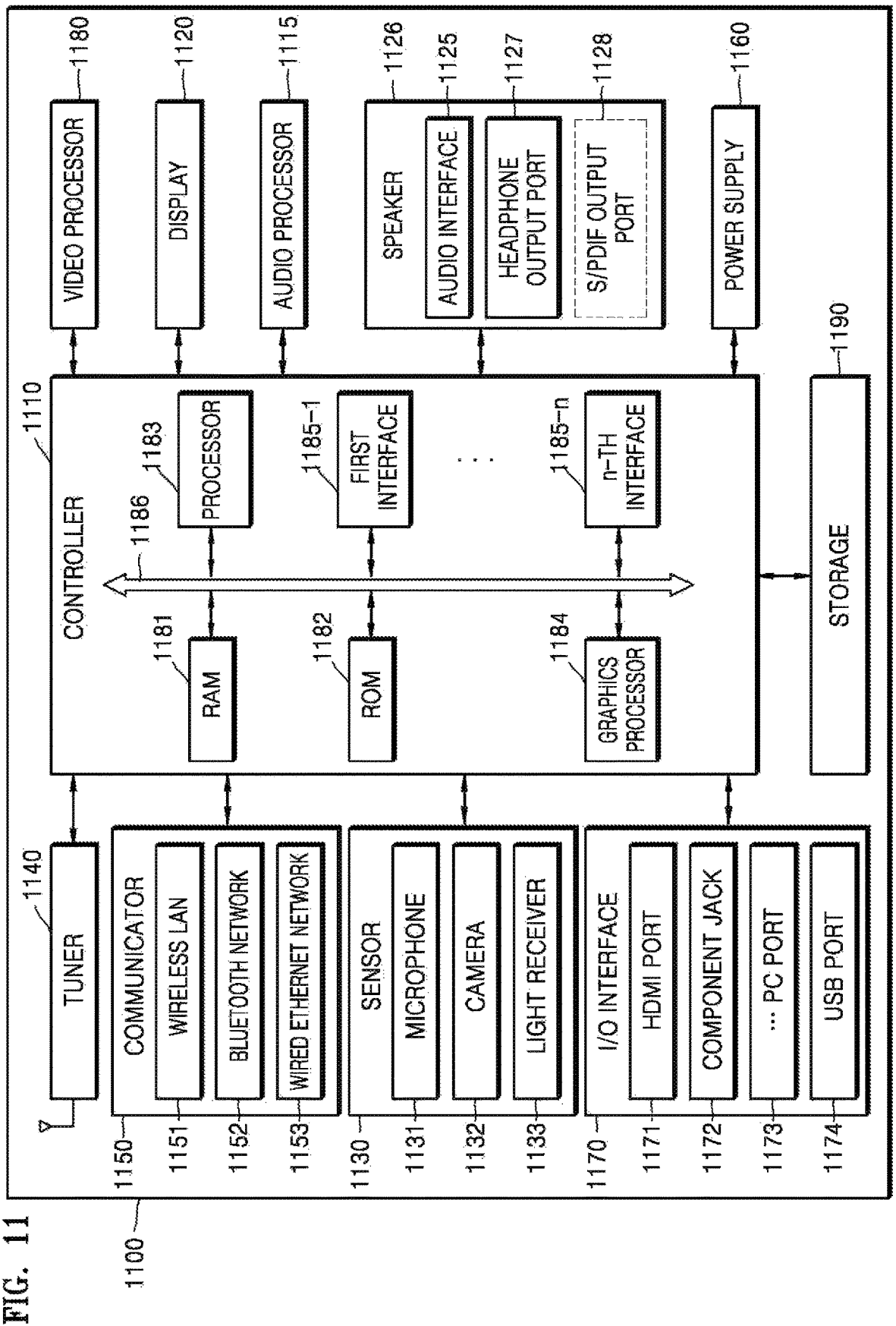
FIG. 11 is a block diagram of an electronic device according to an embodiment of the present disclosure.

FIG. 11 is a block diagram of an electronic device 1100 according to an exemplary embodiment. The electronic device 1100 may be the electronic device 201 of FIG. 2.

As shown in FIG. 11, the electronic device 1100 may include a controller 1110, a display 1120, a sensor 1130, a video processor 1180, an audio processor 1115, an audio interface 1125, a power supply 1160, a tuner 1140, a communicator 1150, an I/O interface 1170, and a storage 1190.

The communication interface 270 of FIG. 2 may correspond to the communicator 1150 of FIG. 11, the processor 220 of FIG. 2 may correspond to the controller 1110 of FIG. 11, the memory 230 of FIG. 2 of FIG. 2 may correspond to the storage 1190 of FIG. 11, and the I/O interface 250 of FIG. 2 may correspond to the I/O interface 1170 of FIG. 11.

The video processor 1180 processes video data that is received by the electronic device 1100. The video processor 1180 may perform a variety of image processing tasks, such as decoding, scaling, noise filtering, frame rate transformation, and resolution transformation, on video data.

The display 1120 may generate a driving signal by converting an image signal, a data signal, an on-screen display (OSD) signal, and a control signal that are processed by the controller 1110. The display 1120 may be a plasma display panel (PDP), a liquid-crystal display (LCD), an organic light-emitting device (OLED), a flexible display, and/or a 3D display. The display 1120 may be configured as a touch screen, and thus may serve as an input device as well as an output device.

The display 1120 may display a video image included in a broadcasting signal received via the tuner 1140 on the screen thereof, under the control of the controller 1110. The display 1120 may also display content (e.g., a video) that is input via the communicator 1150 or the I/O interface 1170. The display 1120 may output an image stored in the storage 1190 under the control of the controller 1110. The display 1120 may also display a voice user interface (UI) (e.g., including a voice command word guide) for performing voice recognition, or a motion UI (e.g., including a user motion guide for motion recognition) for performing motion recognition.

The audio processor 1115 may process audio data. The audio processor 1115 may perform a variety of processing tasks, such as decoding, amplification, or noise filtering, on the audio data. The audio processor 1115 may include a plurality of audio processing modules to process audios corresponding to a plurality of pieces of content.

The audio interface 1125 may output audio included in a broadcasting signal received via the tuner 1140, under the control of the controller 1110. The audio interface 1125 may also output audio (e.g., a voice or a sound) that is input via the communicator 1150 or the I/O interface 1170. The audio interface 1125 may also output audio stored in the storage 1190 under the control of the controller 1110. The audio interface 1125 may include a speaker 1126, a headphone output port 1127, and/or a Sony/Philips Digital Interface (S/PDIF) output port 1128.

The power supply 1160 may supply power that is input from an external power source, to the internal components of the electronic device 1100, under the control of the controller 1110. The power supply 1160 may also supply power that is output by one or more batteries located in the electronic device 1100, to the internal components of the electronic device 1100, under the control of the controller 1110.

The tuner 1140 may tune to and select only a frequency of a channel which the electronic device 1100 wants to receive from among many radio wave components that are obtained via amplification, mixing, resonance, or the like of a wired or wireless broadcasting signal. The broadcasting signal includes audio, video, and additional information (e.g., an electronic program guide (EPG)).

The tuner 1140 may receive a broadcasting signal in a frequency band corresponding to a channel number (e.g., cable broadcast channel no. 2) according to a user input (e.g., a control signal received from an external control apparatus, a channel number input, a channel up-down input, and a channel input on an EPG screen image).

The tuner 1140 may receive a broadcast signal from various sources, such as terrestrial broadcasting, cable broadcasting, satellite broadcasting, and Internet broadcasting. The tuner 1140 may also receive a broadcast signal from a source such as analog broadcasting or digital broadcasting. The broadcast signal received via the tuner 1140 may be decoded (e.g., via audio decoding, video decoding, or additional information decoding) and may thus be divided into audio, video, and/or additional information. The audio, the video, and/or the additional information may be stored in the storage 1190 under the control of the controller 1110.

The electronic device 1100 may include a single tuner 1140 or a plurality of tuners 1140. The tuner 1140 may be housed inside the electronic device 1100, or implemented as a separate device (e.g., a tuner that is connected to a set-top box through the I/O interface 1170) having a tuner that is electrically connected to the electronic device 1100.

The sensor 1130 may sense a voice of a user, an image of the user, or an interaction with the user.

The microphone 1131 may receive an uttered voice of the user. The microphone 1131 may transform the received voice into an electrical signal and output the electrical signal to the controller 1110. The mic 1131 may be integrated with or separate from the electronic device 1100. The separated mic 1131 may be electrically connected to the electronic device 1100 via the communicator 1150 or the I/O interface 1170. It will be easily understood by one of ordinary skill in the art that the mic 1131 may be excluded according to the performance and structure of the electronic device 1100.

A camera 1132 may receive an image (e.g., consecutive frames) corresponding to a motion of the user including a gesture within a recognition range of the camera 1132. The motion of the user may include a part of the body of the user or a motion or the like of the part of the user, such as the face, a facial expression, the hand, the fist, and a finder of the user. The camera 1132 may convert a received image into an electrical signal under the control of the controller 1110 and output the electrical signal to the controller 1110.

The controller 1110 may select a menu that is displayed on the electronic device 1100 by using a result of the recognition of the received motion, or perform control corresponding to the result of the motion recognition. For example, the control may be channel adjustment, volume adjustment, indicator movement, or cursor movement.

The camera 1132 may include a lens and an image sensor. The camera 1132 may support optical zoom or digital zoom by using a plurality of lenses and image processing. The recognition range of the camera 1132 may vary according to the angle of the camera 1132 and surrounding environment conditions. When the camera 1132 is comprised of a plurality of cameras, a three-dimensional (3D) still image or a 3D motion may be obtained by the plurality of cameras.

The camera 1132 may be integrated with or separate from the electronic device 1100. A separate device including the separate camera 1132 may be electrically connected to the electronic device 1100 via the communicator 1150 or the I/O interface 1170.

It will be easily understood by one of ordinary skill in the art that the camera 1132 may be excluded according to the performance and structure of the electronic device 1100.

A light receiver (i.e., optical sensor) 1133 may receive an optical signal (including a control signal) from an external control apparatus via a light window of the bezel of the display 1120. The light receiver 1133 may receive an optical signal corresponding to a user input (e.g., touch, pressure, a touch gesture, a voice, or a motion) from the external control apparatus. A control signal may be extracted from the received optical signal under the control of the controller 1110.

The I/O interface 1170 may receive video, audio (e.g., a voice or music), and additional information (e.g., an EPG) from an external source under the control of the controller 1110. The I/O interface 1170 may include a High-Definition Multimedia Interface (HDMI) port 1171, a component jack 1172, a PC port 1173, and/or a USB port 1174.

It will be understood by one of ordinary skill in the art that the structure and operation of the I/O interface 1170 may be variously implemented according to embodiments.

The controller 1110 may control an overall operation of the electronic device 1100 and signal transfer among the internal components of the electronic device 1100 and processes data. When there is an input of a user or stored preset conditions are satisfied, the controller 1110 may execute an operation system (OS) and various applications that are stored in the storage 1190.

The controller 1110 may process an image signal and transmit the processed image signal to the display 1120. Accordingly, an image corresponding to the processed image signal may be displayed on the display 1120. The controller 1110 may control the electronic device 1100 via a user command detected by the sensor 1130 or an internal program.

The controller 1110 may include random-access memory (RAM) 1181 that stores a signal or data input by an external source of the electronic device 1100 or is used as a memory area for various operations performed by the electronic device 1100, read-only memory (ROM) 1182 that stores a control program for controlling the electronic device 1100, and a processor 1183.

The processor 1183 may include a graphics processing unit (GPU) for performing video graphics processing. The processor 1183 may be implemented as a system-on-chip (SoC) including a core and a GPU.

A graphics processor 1184 may generate a screen image including various objects, such as an icon, an image, and a text, by using an arithmetic unit and a rendering unit. The arithmetic unit calculates attribute values, such as a coordinate value, a shape, a size, a color, and the like, with which each object is to be displayed according to layouts of the screen image, based on the user interaction sensed by the sensor 1130. The rendering unit generates screen images of various layouts including objects, based on the attribute values calculated by the arithmetic unit. The screen images generated by the rendering unit are displayed on a display area of the display 1120.

First through n-th interfaces 1185-1 through 1185-*n* are connected to the above-described components of the electronic device 1100. One of the first through n-th interfaces 185-1 through 185-*n* may be a network interface that is connected to an external apparatus via a network.

The RAM 1181, the ROM 1182, the processor 1183, the graphics processor 1184, and the first through n-th interfaces 1185-1 through 1185-*n* may be connected to each other via an internal bus 1186.

The term "a controller of an electronic device" used in the present embodiment may include the processor 1183, the ROM 1182, and the RAM 1181.

The storage 1190 may store various data, programs, or applications for driving and controlling the electronic device 1100 under the control of the controller 1110. The storage 1190 may store input/output signals or data corresponding to driving of the video processor 1180, the display 1120, the audio processor 1115, the audio interface 1125, the power supply 160, the tuner 1140, the communicator 1150, the sensor 1130, and the I/O interface 1170. The storage 1190 may store a control program for controlling the electronic device 1100 and the controller 1110, an application initially provided by a manufacturer or downloaded from outside the electronic device 1100, a graphical user interface (GUI) associated with the application, objects (for example, an image text, an icon, and a button) for providing the GUI, user information, a document, databases, or related pieces of data.

According to an exemplary embodiment, the term "storage" may include the storage 1190, the ROM 1182 or the RAM 1181 of the controller 1110, or a memory card (e.g., a micro SD card or a USB memory) mounted in the electronic device 1100. The storage 1190 may include a non-volatile memory, a volatile memory, a hard disk drive (HDD), or a solid-state drive (SSD).

The storage 1190 may include a broadcasting receiving module, a channel control module, a volume control module, a communication control module, a voice recognition module, a motion recognition module, a light receiving module, a display control module, an audio control module, an external input control module, a power control module, a power control module of a wirelessly (e.g., Bluetooth) connected external apparatus, a voice database (DB), and/or a motion DB. These modules and the DBs of the storage 1190 may be implemented as software in order to perform a broadcasting reception control function, a channel control function, a volume control function, a communication control function, a voice recognition function, a motion recognition function, a light receiving control function, a display control function, an audio control function, an external input control function, a power control function, and/or a power control function of the wirelessly (e.g., Bluetooth) connected external apparatus in the electronic device 1100. The controller 1110 may perform these functions by using the software stored in the storage 1190.

The electronic device 1100 having the display 1120 may be electrically connected to an external apparatus (e.g., a set-top box) having a tuner. For example, the electronic device 1100 may be implemented by using an analog TV, a digital TV, a 3D-TV, a smart TV, an LED TV, an OLED TV, a plasma TV, a monitor, or the like, but it will be easily understood by one of ordinary skill in the art to which the present disclosure pertains that embodiments of the present disclosure are not limited thereto.

The electronic device 1100 may include a sensor (e.g., an illumination sensor or a temperature sensor) for detecting an internal or external state of the electronic device 1100.

According to various embodiments of the present disclosure, an electronic device may adaptively determine whether to start reproducing content that is streamed, based on a network situation.

At least some of devices (e.g., modules and their functions) or methods (e.g., operations) according to various embodiments may be implemented through, for example, commands stored in the form of program modules in computer-readable storage media. When the commands are executed by a processor (e.g., the processor 120), the at least one processor may execute functions corresponding to the commands. The computer-readable storage media may be, for example, the memory 230.

Examples of the computer-readable storage media include hard discs, floppy discs, magnetic media (e.g., Magnetic tapes), optical media (e.g., compact disc read-only memory (CD-ROM), or digital versatile disc (DVD)), magneto-optical media (e.g., floptical disks), and hardware devices (e.g., read-only memory (ROM), random access memory (RAM), or flash memory). Examples of the program commands may include advanced language codes that can be executed by a computer by using an interpreter or the like as well as machine language codes made by a compiler. The hardware devices can be configured to function as one or more software modules so as to perform operations according to various embodiments, or vice versa.

Modules or program modules according to various embodiments may include at least one of the aforementioned components. Some of the aforementioned components may be omitted, or other components may be further included in addition to the aforementioned components. Operations performed by modules, program modules, or other components according to various embodiments may be executed in a sequential, parallel, iterative, or heuristic manner. Some of the operations may be executed in another sequence, some of the operations may be omitted, or other operations may be further included in addition to the operations. It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An electronic device comprising:
    a communicator configured to receive content from an external device via a network;
    a display
    a processor; and
    a memory storing one or more programs executable by the processor,
    wherein the one or more programs comprise instructions for:
        determining a buffering amount which is needed to start reproducing the content, buffering the received content,
        in response to an amount of the buffered content being equal to the determined buffering amount, starting reproducing of the buffered content,
        while the amount of the buffered content is less than the determined buffering amount, comparing a content download speed of the received content with a playback speed of the received content, the playback speed being a speed at which the buffered content is reproduced in the electronic device, and
        starting reproduction of the buffered content in response to the content download speed of the received content being higher than the playback speed of the received content.

2. The electronic device of claim 1, wherein the one or more programs further comprise instructions for:
    comparing a time period during which the buffered content is reproducible with a time period taken to receive the content; and
    determining when to start reproducing the content further based on a result of the comparing the time period during which the buffered content is reproducible with the time period taken to receive the content.

3. The electronic device of claim 1, wherein the communicator is further configured to receive at least one of a first content item having a first playback speed and a second content item having a second playback speed,
    wherein the first content item and the second content item have a same subject matter, and
    wherein the first playback speed is different from the second playback speed.

4. The electronic device of claim 1, wherein the one or more programs further comprise instructions for requesting the external device to transmit additional content having a same subject matter as the received content and a playback speed different from the playback speed of the received content, in response to the content download speed of the received content being higher than the playback speed of the content.

5. The electronic device of claim 2, wherein the one or more programs further comprise instructions for requesting the external device to transmit additional content having a same subject matter as the received content and a bitrate different from a bitrate of the received content in response to the time period during which the buffered content is reproducible being greater than the time period taken to receive the content.

6. The electronic device of claim 2, wherein the one or more programs further comprise instructions for starting reproduction of the received content in response to the time period during which the buffered content is reproducible being greater than the time period taken to receive the content.

7. The electronic device of claim 1, wherein the one or more programs further comprise instructions for:
    determining, while buffering the received content, a start time for reproducing the received content based on a result of the comparing a status of the network with a bitrate of the received content when an available reproduction time for the received content is less than a threshold time duration.

8. A method, controlled by an electronic device, of reproducing content received from an external device, the method comprising:
    receiving content from the external device via a network;

determining a buffering amount which is needed to start reproducing the content;

buffering the received content;

in response to an amount of the buffered content being equal to the determined buffering amount, starting reproducing of the buffered content, while the amount of the buffered content is less than the determined buffering amount, comparing a content download speed of the received content with a playback speed of the received content, the playback speed being a speed at which the buffered content is reproduced in the electronic device; and starting reproduction of the buffered content in response to the content download speed of the received content being higher than the playback speed of the received content.

9. The method of claim 8, further comprising, in response to the content download speed of the content being higher than the playback speed of the received content, requesting the external device to transmit additional content having a subject matter as the received content and having a playback speed different from the playback speed of the received content.

10. The method of claim 8, further comprising:

comparing a time period during which the buffered content is reproducible with a time period taken to receive the content; and determining when to start reproducing of the received content further based on a result of the comparing the time period during which the buffered content is reproducible with the time period taken to receive the content.

11. The method of claim 10, wherein the comparing of the time period during which the buffered content is reproducible with the time period taken to receive the content comprises:

determining whether the time period during which the buffered content is reproducible is greater than the time period taken to receive the content; and requesting the external device to transmit additional content having a same subject matter as the received content and having a playback speed different from the playback speed of the received content.

12. The method of claim 10, wherein the comparing of the time period during which the buffered content is reproducible with the time period taken to receive the content comprises starting reproducing of the received content in response to the time period during which the buffered content is reproducible being greater than the time period taken to receive the content.

13. The method of claim 10, further comprising:

determining, while buffering the received content, a start time for reproducing the received content based on a result of the comparing a status of the network with a bitrate of the received content when an available reproduction time for the received content is less than a threshold time duration.

14. A non-transitory computer-readable recording medium having recorded thereon a program for performing the method of claim 8.

* * * * *